(12) United States Patent
Kobylarz

(10) Patent No.: US 7,827,904 B2
(45) Date of Patent: Nov. 9, 2010

(54) APPARATUS AND METHOD FOR BREWER CONTROL

(75) Inventor: Robert J. Kobylarz, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 830 days.

(21) Appl. No.: 10/513,761

(22) PCT Filed: May 6, 2003

(86) PCT No.: PCT/US03/14333

§ 371 (c)(1),
(2), (4) Date: Jul. 13, 2005

(87) PCT Pub. No.: WO03/092457

PCT Pub. Date: Nov. 13, 2003

(65) Prior Publication Data

US 2005/0284304 A1    Dec. 29, 2005

(51) Int. Cl.
*A47J 31/00* (2006.01)

(52) U.S. Cl. .............................. 99/280; 99/305; 99/306

(58) Field of Classification Search ................... 99/306, 99/304, 305, 280, 283
See application file for complete search history.

(56) References Cited

U.S. PATENT DOCUMENTS

| | | | |
|---|---|---|---|
| 1,648,699 A | 11/1927 | Shroyer | |
| 2,688,911 A | 9/1954 | Hochmayr | |
| 2,711,727 A | 6/1955 | Albano | |
| 2,926,234 A | 2/1960 | Palmer | |
| 3,505,947 A | 4/1970 | Bresaola | |
| 3,691,933 A | 9/1972 | Martin | |
| 3,948,156 A | 4/1976 | Smith | |
| 4,064,795 A | 12/1977 | Ackerman | |
| 4,094,233 A | 6/1978 | Martin | |
| 4,143,589 A | 3/1979 | Weber | |
| 4,464,981 A | 8/1984 | Stover | |
| 4,917,005 A * | 4/1990 | Knepler | ........................ 99/280 |
| 4,922,809 A | 5/1990 | Fuhner | |
| 5,000,082 A | 3/1991 | Lassota | |

(Continued)

*Primary Examiner*—Reginald L Alexander
(74) *Attorney, Agent, or Firm*—Barnes & Thornburg LLP

(57) ABSTRACT

A beverage making apparatus, method, method of using such a beverage making apparatus and method of cleaning a beverage making apparatus is disclosed. The beverage making apparatus includes a liquid basin (16) for receiving a quantity of liquid and is in communication with a reservoir (20) for retaining a volume of heated liquid. A control valve (40) is provided and positioned for communication with the basin and reservoir for controlling flow of liquid from the basin to the reservoir. A controller (14) is coupled to the control valve for at least selectively operating the control valve for selectively controlling the flow of liquid from the basin to the reservoir. The control valve can be selectively operated to produce a generally continuous flow of liquid from the basin to the reservoir or may be controller for multiple dispensings of liquid from the basin to the reservoir during a brewing cycle. A liquid delivery assembly shown in one form as a tube (18) which communicates with the reservoir and a beverage substance retaining funnel (28) is provided without any interruptions along its length. The absence of any control devices along the length of the tube allows for particles, lime and other mineral deposits to be removed from the tube along its entire length extending from a spray head to a port in the reservoir.

22 Claims, 7 Drawing Sheets

U.S. PATENT DOCUMENTS

| | | |
|---|---|---|
| 5,241,898 A | 9/1993 | Newnan |
| 5,307,733 A | 5/1994 | Enomoto |
| 5,490,448 A | 2/1996 | Weller et al. |
| 5,735,189 A | 4/1998 | King |
| 5,813,317 A | 9/1998 | Chang |
| 5,901,635 A | 5/1999 | Lucas et al. |
| 5,907,993 A | 6/1999 | Van Camp et al. |
| 5,943,944 A | 8/1999 | Lassota |
| 6,067,895 A | 5/2000 | Buist et al. |
| 6,082,247 A | 7/2000 | Beaulicu |
| 6,095,031 A | 8/2000 | Warne |
| 6,135,009 A | 10/2000 | Lassota |
| 6,148,717 A | 11/2000 | Lassota |
| 6,339,985 B1 | 1/2002 | Whitney |
| 6,752,069 B1 | 6/2004 | Burke et al. |
| 7,228,066 B2 * | 6/2007 | Pope .......................... 392/441 |
| 2004/0194631 A1 * | 10/2004 | Pope .......................... 99/279 |

* cited by examiner

APPARATUS AND METHOD FOR BREWER CONTROL

BACKGROUND

This disclosure is generally directed to a beverage making apparatus or brewer with controls to control the flow of water and methods of brewing and using the brewer with controls. The beverage making apparatus includes a liquid basin for receiving a liquid and is placed in communication with the basin and reservoir for controlling flow of liquid from the basin to the reservoir. A controller is coupled with the control valve for at least selectively operating the control valve for controlling the flow of liquid from the basin to the reservoir.

Water reservoirs are used in beverage making equipment to store and heat hot water that will be dispensed over a beverage making substance such as coffee grounds. The flow of water into such water reservoirs is customarily controlled by a solenoid valve located between a pressurized water line and a pour-in basin of the beverage maker. The purpose of this valve is to direct a specific volume of water into the pour-in basin. This purpose is accomplished by connecting the solenoid valve to a timer which opens the valve for a predetermined period calculated to direct the desired volume of water into the pour-in basin.

When an operator initiates a brew, a controller opens a solenoid valve connected to a pressurized water source for a predetermined period of time. Water then flows into the pour-in basin and then into a reservoir. A siphon tube protrudes from a wall of the water reservoir near a top portion of the water reservoir top and communicates a spray head positioned above a brewing basket which contains a brewing substance. When the water reaches the top of the siphon tube, water begins to flow through the siphon tube and out of the spray head onto the brewing substance. At the end of the predetermined period of time, the controller stops the water flow. As the water level drops below the highest level of the siphon tube, water dispensing from the spray head continues due to a siphoning action caused by the difference in height between the spray head and a siphon break point. Flow stops abruptly when the water level falls below the siphon break point.

It is desirable to be able to control dispensing of heated water through the siphon tube and onto the brewing substance. Such control is useful when short bursts of dispensing are used to pre-wet or pre-infuse the brewing substance. Brewers are available to control the dispensing of heated water by placing a solenoid valve along the siphon tube. One problem with such placement is that deposits of lime and other minerals may accumulate in the siphon tube. Placement of the solenoid valve along the siphon tube prevents insertion of a wire brush or spring to remove such deposits because the wire brush or spring cannot be inserted through the valve. As such, the entire length of the siphon tube cannot be cleaned. There is therefore a need for a beverage maker which provides control over dispensing and that also allows for easy and thorough cleaning of the entire length of the siphon tube.

Another problem with currently available brewers is that they rely on water pressure from pressurized water lines being constant. When the water pressure is inconsistent, the solenoid valve will be open for a period during which water is not actually flowing resulting in an improper volume of water being directed into the pour-in basin.

Another issue related to pour-over type brewers is that these brewers typically are not conducive to timed control or brewing., For example, additional brewers which include a reservoir of unheated water which is heated at the start of a brewing process have been connected to time control systems. However, pour-over brewers have not been configured with a timer system. This is because the aforementioned difficulties in controlling the flow of the heated water from the heated water reservoir. In other words, the pour-over brewer is configured such that the basin communicates with the heated water reservoir. When unheated water is added to the basin it flows on a gravity feed basis from the basin to the heated water reservoir. Upon flowing into the heated water reservoir the unheated water displaces the water in the heated water reservoir and pushes it out through a tube connected to a spray head. As water flows through the tube and spray head it is dispensed over the coffee brewing material. For the reasons noted above, it has been difficult to overcome the problems associated with placing a control valve on the outlet of the heated water reservoir.

Briefly, and in accordance with the foregoing, this disclosure provides a brewer with controls to control flow of water flowing into the water reservoir from the pour-in basin and methods of brewing and using the brewer with controls. By controlling the volume of water flowing into the reservoir, the problem associated with inconsistencies in line pressure described above are overcome. The disclosure provides such control while still allowing a user full access into a siphon tube connected to a water reservoir to remove mineral deposits therein. A controller controls a valve communicating with the pour-in basin and the water reservoir.

Additional features of the disclosure will become apparent upon consideration of the following detailed description of embodiments of the disclosed apparatus, methods and methods of using the apparatus.

BRIEF DESCRIPTION OF THE DRAWINGS

The detailed description particularly refers to the accompanying figures in which.

DETAILED DESCRIPTION OF THE DRAWINGS

Figure 1:
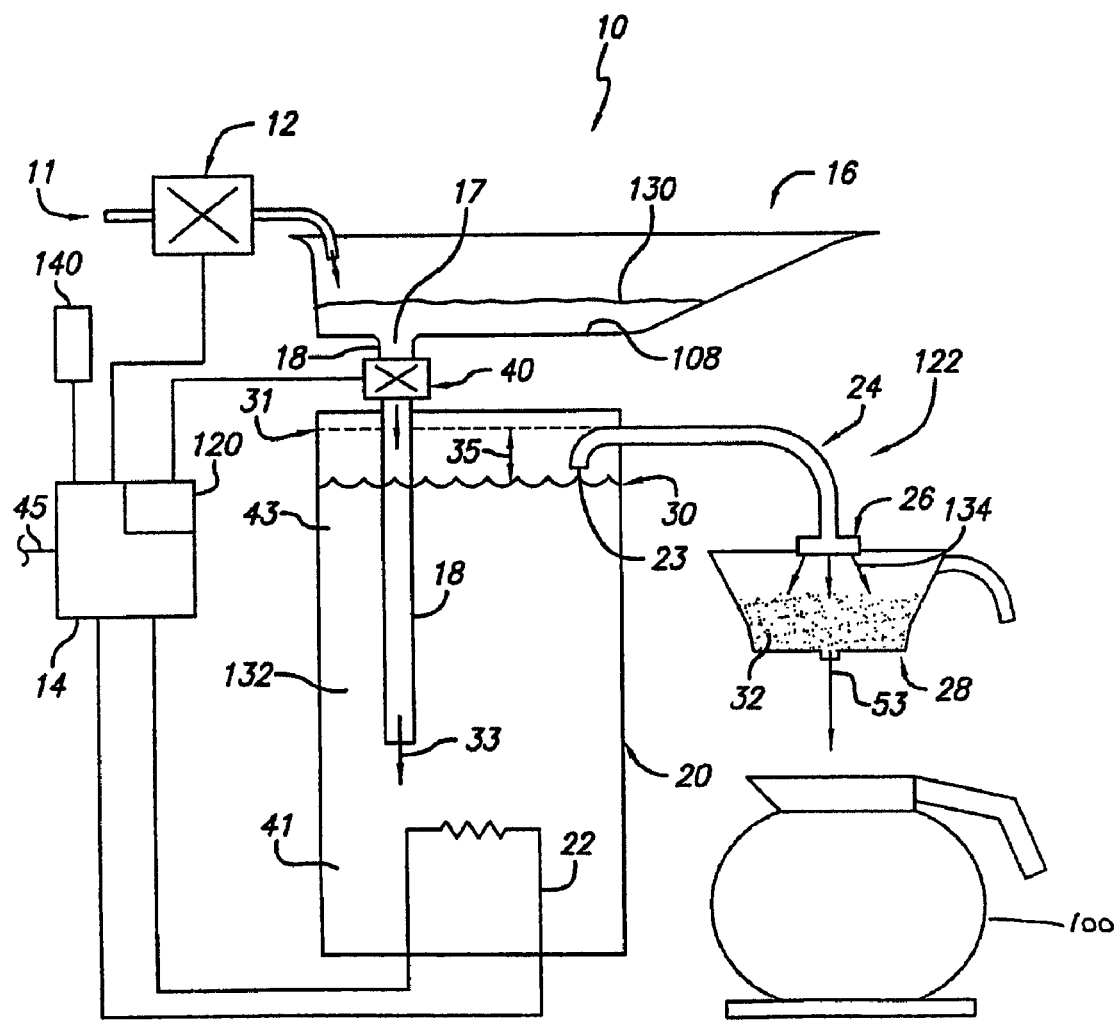
FIG. 1 is a diagrammatic cross-sectional view of a beverage maker locating a control valve generally between a pour-in basin and a water reservoir.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Terms including beverage and beverage making as used herein are intended to be broadly defined as including but not limited to the brewing of coffee, tea and any other brewed beverage including a final beverage or food product as well as producing an intermediate product to be combined with a final beverage or food product. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Figure 2:
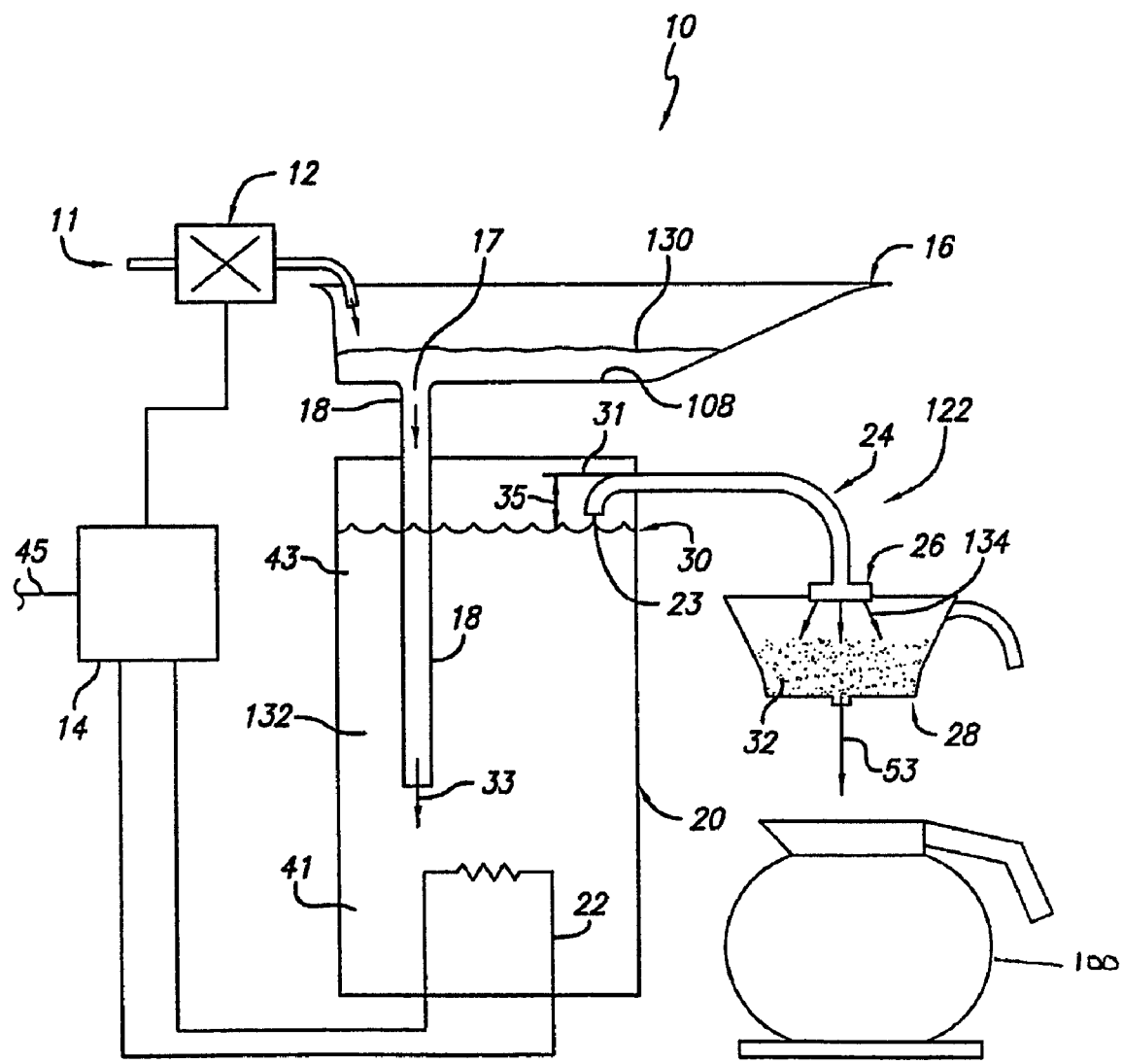
FIG. 2 is a diagrammatic cross-sectional view of a prior art brewer.

With reference to the figures, FIG. 1 shows a diagrammatic cross-sectional view of a beverage making apparatus 10. While a beverage making apparatus is shown in the figures generally in the form of a beverage brewing apparatus, it is envisioned that other forms of beverage making apparatus could use the present configuration. It is within the spirit and scope of the present application to include all variations of beverage making apparatus employing the structures, functions and methods as disclosed herein. Pressurized water enters the apparatus 10 through a pressurized water line 11. An inlet line solenoid valve 12 is controllably operated by a controller 14 to open and close the pressurized water line 11 for a predetermined period. The time period during which the inlet line solenoid valve 12 remains open is calculated to allow a desired volume of water to be dispensed into the pour in basin 16 based on the timed flow rate of the pressurized water. In prior art brewer controls, such as the one shown in FIG. 2, this solenoid valve 12 may have been the only valve used to control the volume of water dispensed into the pour-in basin 16.

Water may also be introduced into the beverage making apparatus 10 by manually pouring the water directly into the pour-in basin 16. To measure the desired volume, the user might pour water into a measuring device such as a pitcher or measuring cup and pour the measured water into the pour-in basin 16. The ability to manually dispense water into the pour-in basin is useful in situations where a pressurized water source is unavailable, does not provide reliable pressure or if the pressurized water source fails. As long as a source of power 45 is available, line or portable, the beverage maker as disclosed can produce beverage.

Referring again to FIG. 1, water in a pour-in basin 16 flows through a fill passage 17 formed in the basin 16 and communicating with the reservoir 20. Water flowing through the fill passage 17 is shown in FIG. 1 as flowing into a connecting fill tube 18 into a water reservoir 20. A control valve 40 is located along the connecting fill tube 18. The control valve 40 may be in the form of a solenoid valve of known construction and is controllably operated by the controller 14 of known construction. When the control valve 40 is open, water flows from the pour-in basin 16 into the water reservoir 20. The connecting fill tube 18 extends into the reservoir 20 proximate to a heating element 22 positioned generally near a lower portion 41 of the water reservoir 20. This allows for lower temperature water traveling from the pour-in basin 16 to be heated by the heating device or element 22 while contemporaneously displacing heated water in an upper portion 43 of the reservoir 20 up toward the inlet 23 of the siphon tube 24.

A variety of configurations and locations of the control valve 40 are disclosed herein. It is within the spirit and scope of the present application that the structure and function of the control valve is to be broadly interpreted. In other words, the control valve is generally positioned proximate to or at least partially retained in the basin 16 and is also positioned in relation to the fill passage 17, fill tube 18 and the reservoir 20.

As noted above, and further described in detail below, the control valve 40 includes means for controlling water flow from the pour in basin to the reservoir 20. This is also to be broadly interpreted such that the control means 40 can be positioned proximate to or at least partially in the fill basin 16 and regulate the flow of water from the fill basin to the reservoir 20. The fill tube 18 may or may not be used with this broad configuration which is within the scope of the present application. In other words, the basin 16 may be positioned directly on top of the reservoir 20 with only the passage 17 communicating water from the basin to the reservoir. However, such a configuration may include the control valve 40*a* (FIG. 3), 40*b* (FIG. 4), 40*c* (FIG. 5), 40*d* (FIG. 6) and 40*e* (FIG. 7). Any of these other embodiments also allow the valve 40, 40*a-e* to be retrofitted into existing beverage making apparatus or brewers.

Referring again to FIG. 1, as water enters (see arrow 33) the water reservoir 20, the water level 30 rises 35 to a level at or above the highest point 31 of a siphon tube 24. When the water reaches this level 31, water begins to flow through the siphon tube 24 and out of the spray head 26 onto the brewing substance 32 located in the brewing basket 28. Water continues to flow out of the spray head 26 as long as the water level in the water reservoir 20 is above a siphon break point 30.

Control of water dispensing from the spray head 26 is accomplished by operation of the control valve 40. The controller 14 is connected by line 51 and may be used to operate the control valve 40 to perform dispensing of one or more bursts of water to pre-wet or pre-infuse the brewing substance 32. Such pre-wetting or subsequent bursts or pulses of water may be used to modify the flavor characteristics of a resultant beverage 53 dispensed from the funnel 28 into the carafe 100.

Figure 3:
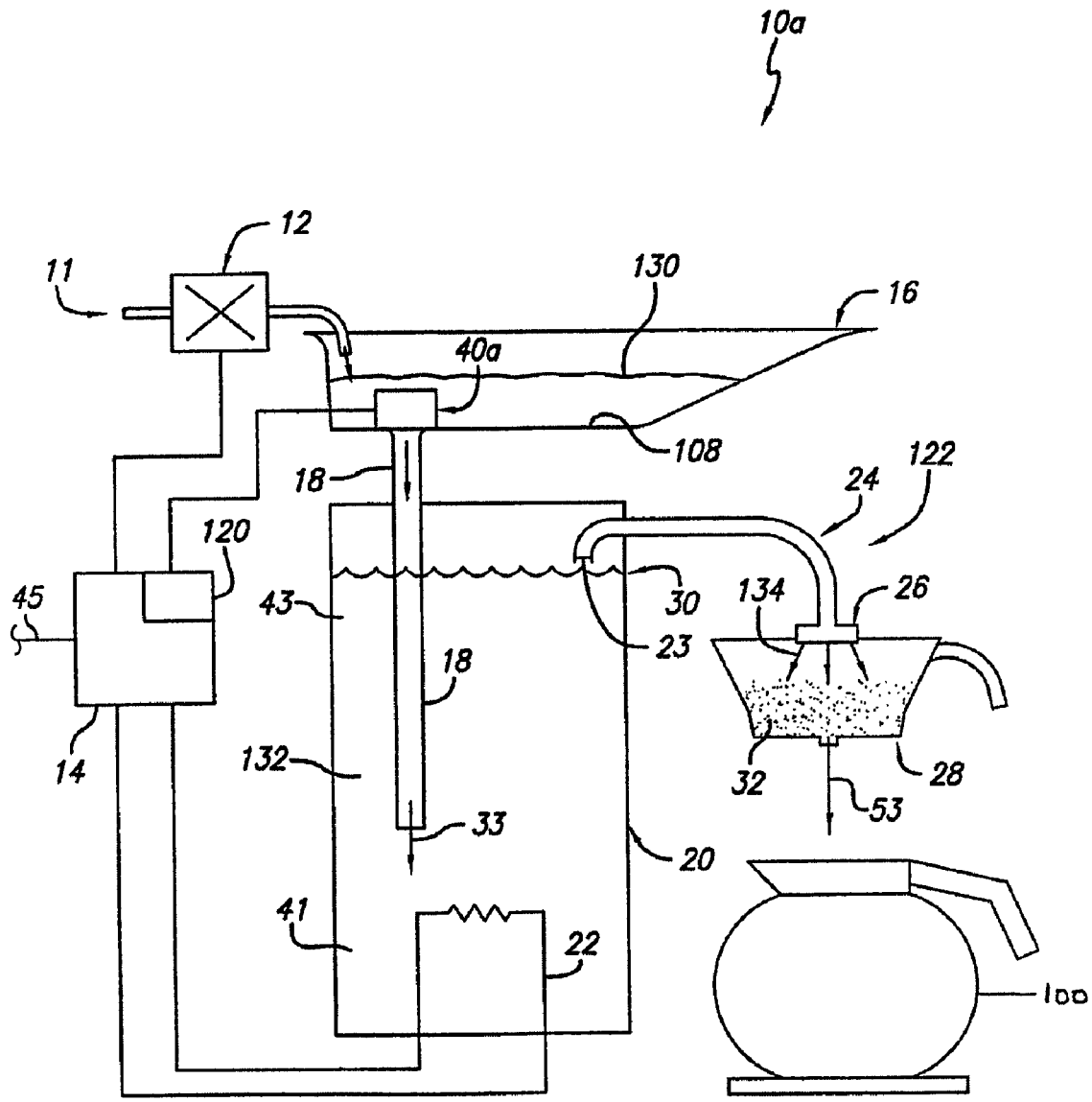
FIG. 3 is a diagrammatic cross-sectional view of another embodiment locating a controllable valve within a pour-in basin.

Referring now to FIG. 3, a diagrammatic cross-section of another embodiment of the brewer 10 is shown. In this embodiment, a controllable valve 40*a* is positioned in the pour-in basin 16 to control the flow of water from the pour-in basin 16 to the water reservoir 20. It should be noted that the various embodiments of he control valve 40 (40*a-e*) is positioned relative to the basin 16 to facilitate draining of the basin 16 into the passage 17 either though the control valve or to the control valve. In embodiments which are partially or wholly in the basin 16 openings are provided in the valve or related structures to drain water from the basin to the passage.

An advantage of this embodiment is that the space between the pour-in basin 16 and the water reservoir 20 can be reduced or eliminated. A space reduction of this sort reduces or maintains the overall minimum height of the beverage maker and allows the control to be added or retrofitted to existing beverage making designs. A second advantage is the accessibility of the components from the top of the brewer which provides for simplified and efficient maintenance and repair. A third advantage over placing the solenoid 40*a* along the connecting tube 18 is that the siphon tube or liquid delivery tube 24 does not have a valve placed along the tube. In this regard, since a valve is not placed along the dispensing tube 24, the tube 24 can be cleaned. It is necessary to periodically clean the tube 24 to remove mineral deposits such as lime which may accumulate on the inside surface of the tube 24. By placing the control valve 40 proximate to the basin and reservoir, there is a clear or open path from the spray head 26 all the way to the inlet 23 of the siphon tube 24. This allows a user to place a wire brush, de-liming spring or other cleaning device through the entire length of the tube 24 providing the ability to clean the tube from the spray head all the way to the reservoir 20.

Figure 4:
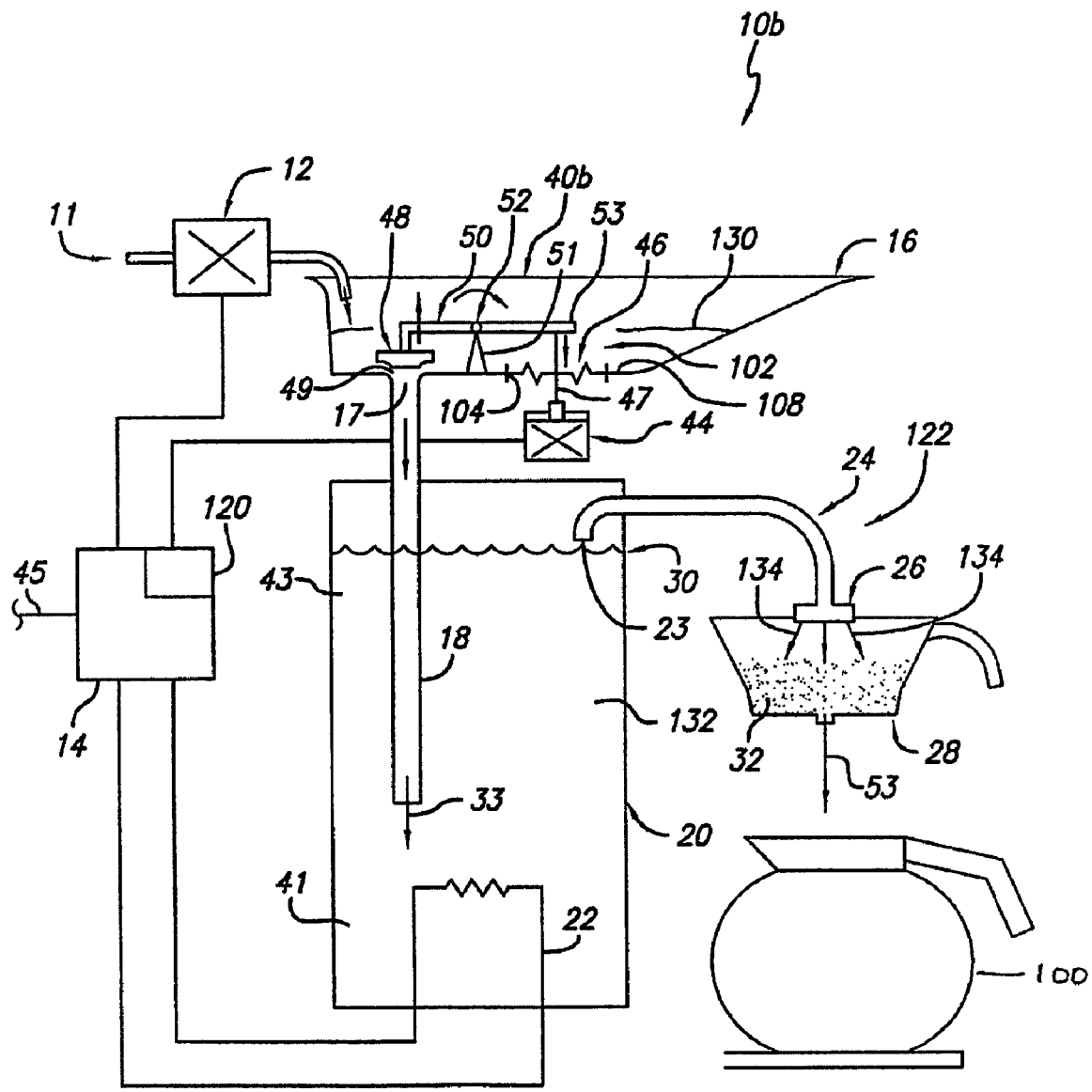
FIG. 4 is a diagrammatic cross-sectional view of another embodiment.

FIG. 4 shows another embodiment of the control valve 40*b* using a controllable stopper moving device 102. The controllable stopper moving device 102 includes a lever 50 which has a stopper 48 at one end and having an end 53 of the lever 50 opposite the stopper 48 connected by means of a connecting member or linkage such as a wire or rod 47 to means for moving the stopper shown in the form of a controllable stopper actuating device 44. Also included is a pivot point 52 of the lever 50 which is positioned on a pivot attachment 51. In the configuration of the stopper moving device 102 as shown in FIG. 4, a flexible diaphragm 46 is positioned in the basin 16 for sealing an opening 104 in the pour-in basin through which the linkage 47 extends connecting at one end to the end 53 of the lever 50 and at a second end to the controllable actuating device 44.

In use, the controller 14 controllably operates the controllable actuation device 44 to move the linkage 47. Movement of the linkage 47 causes pivoting of the lever 50, connected at end 53 to the linkage 46, and movement of the lever 50 about the pivot attachment 51. In the normally closed or default position, the stopper 48 engages a rim 49 of the fill passage 17 thereby blocking the flow of water from the basin 16 into the fill tube 18 and consequently into the reservoir 20. When the controllable actuator device 44 is operated by the controller 14, as shown in FIG. 4, the linkage 46 pulls on the end 53 of the lever 50 causing rotation about the attachment pivot 51 to cause the stopper 48 to rotate upwardly and generally out of engagement from the passage 17. Additionally, the controllable actuator 44 can be controllably operated to be repeatedly open and close the stopper 48 relative to the passage 17. Controllable actuator 44 can be pulsed or energized on and off throughout a brewing cycle depending on the programming and detailed commands provided by the controller 14 to the actuator 44.

In the configuration as shown in FIG. 4, the controllable actuator 44 is shown as being positioned external to the reservoir 16. The other components 48, 50, 51 and the linkage 47 can be made of suitable food grade materials such as plastics to be used in a food contact setting as they are positioned in the food contact area of the basin 16. Positioning of the controllable actuator 44 external to the basin 16 eliminates the need for shielding or otherwise protecting or preventing access of the controllable actuator to the contents of the basin 16. Further, while the actuator 44 is shown positioned generally between the basin 16 and the reservoir 20, it can be positioned out of way of the basin and reservoir such that any space between the basin and reservoir can be eliminated thereby maintaining or reducing the overall height of the beverage maker 10.

Figure 5:
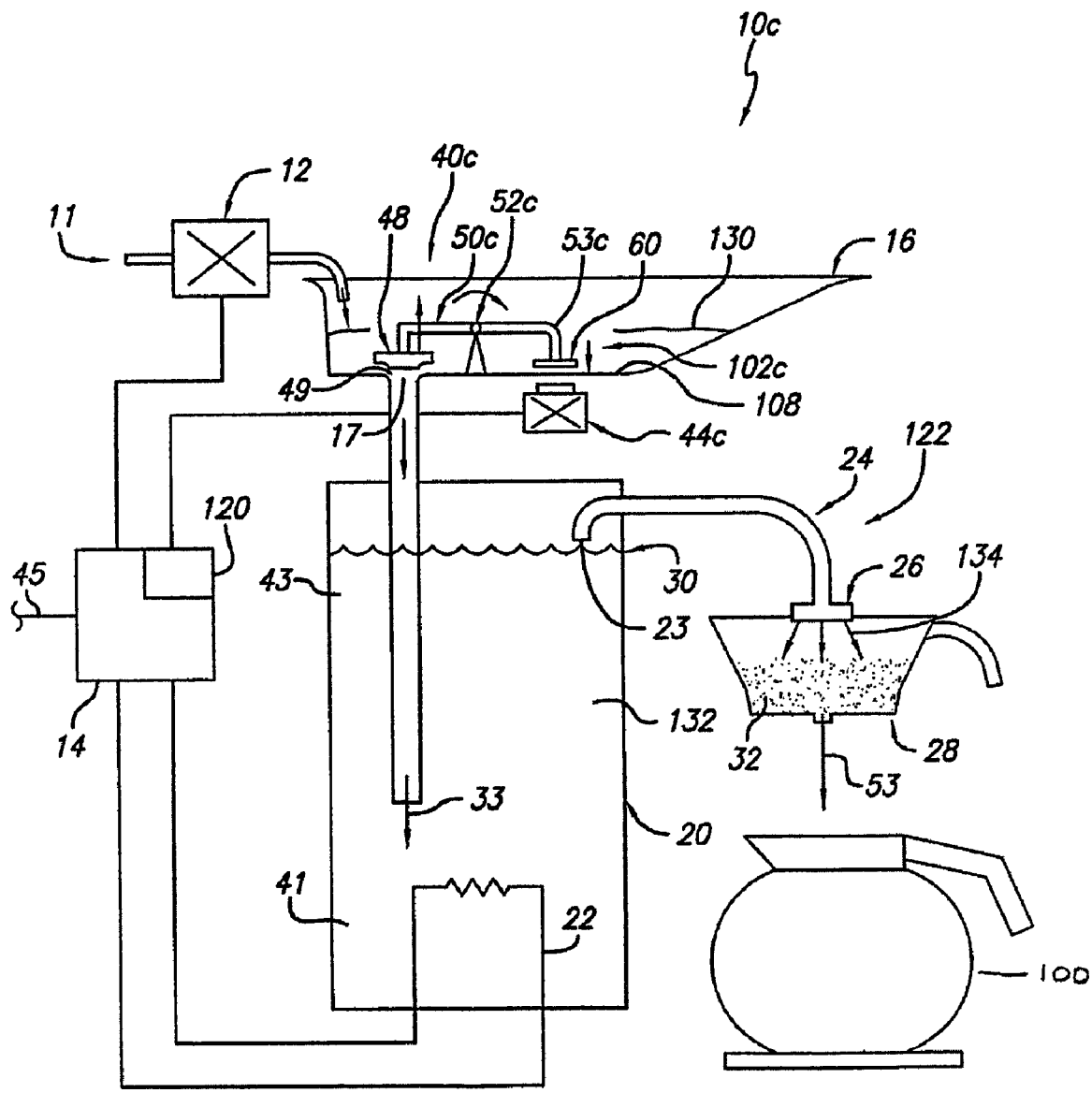
FIG. 5 is a diagrammatic cross-sectional view of another embodiment.

Referring now to FIG. 5, in this embodiment, the controllable stopper moving device 102c includes an electro-magnet 44c which is used to actuate the stopper 48. When the electro-magnet 44c is energized, it attracts a ferrous material or magnet 60 attached the end 53 of the lever 50. Use of a magnet 44c overcomes the need for the diaphragm 46 of the previous embodiment. The components of the controllable stopper moving device 102c positioned in the basin 16 are of a suitable food grade material such as mentioned above. The lever 50c is weighted so that the stopper 48 is in the normally closed position. When the electromagnet 44c is activated by the controller 14 the magnet 60 is attracted to the electromagnet thereby pivoting the stopper 48 out of engagement with the passage 17 and allowing water to flow from the basin 16 to the reservoir 20. Once the electromagnet 44c is powered off the attractive forces which previously drew the magnet 60 toward the electromagnet 44c are removed thereby allowing the lever 50c to pivot into the normally closed position with the stopper 48 closing the passage 17.

Figure 6:
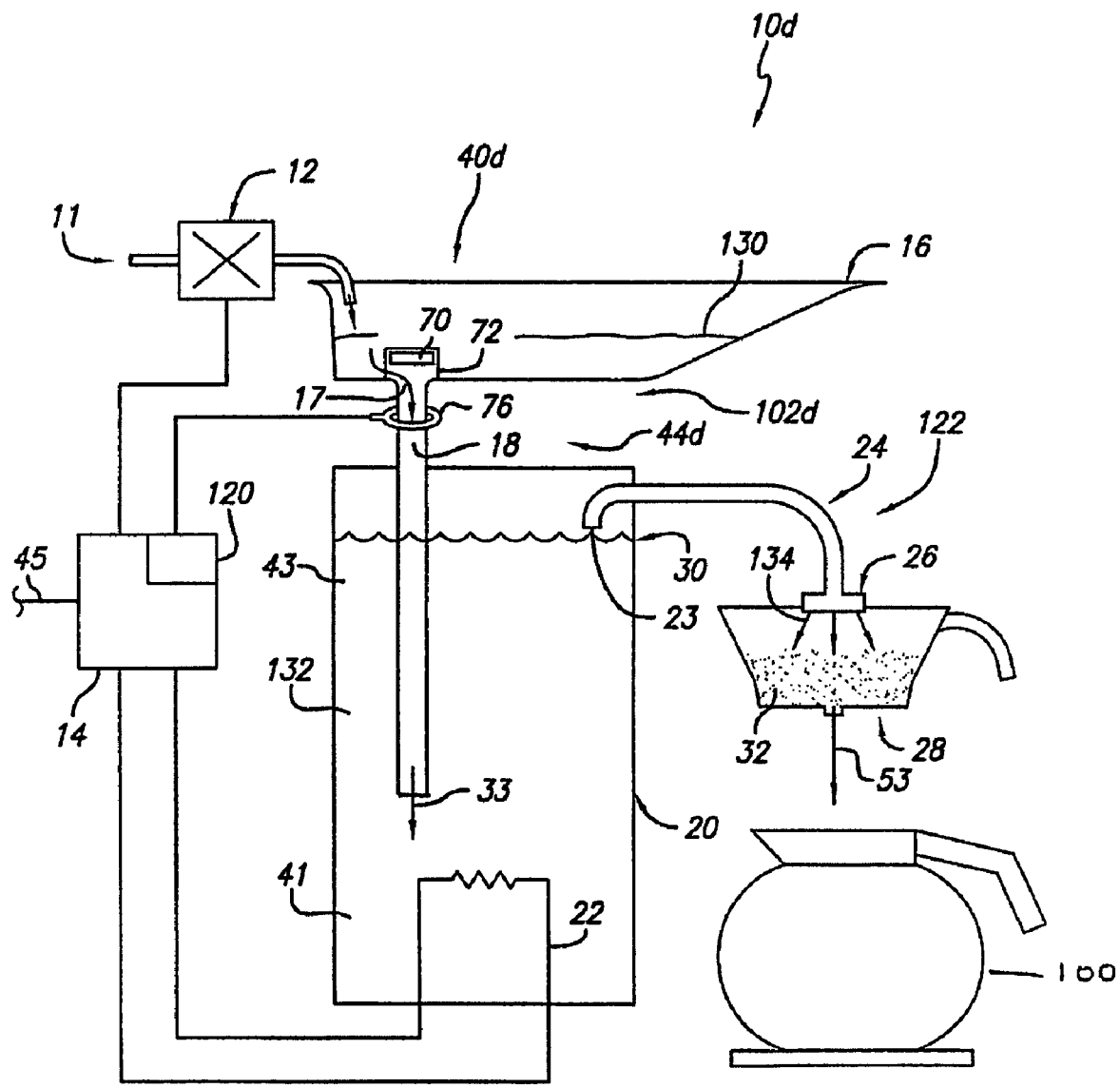
FIG. 6 is a diagrammatic cross-sectional view of another embodiment.
Figure 7:
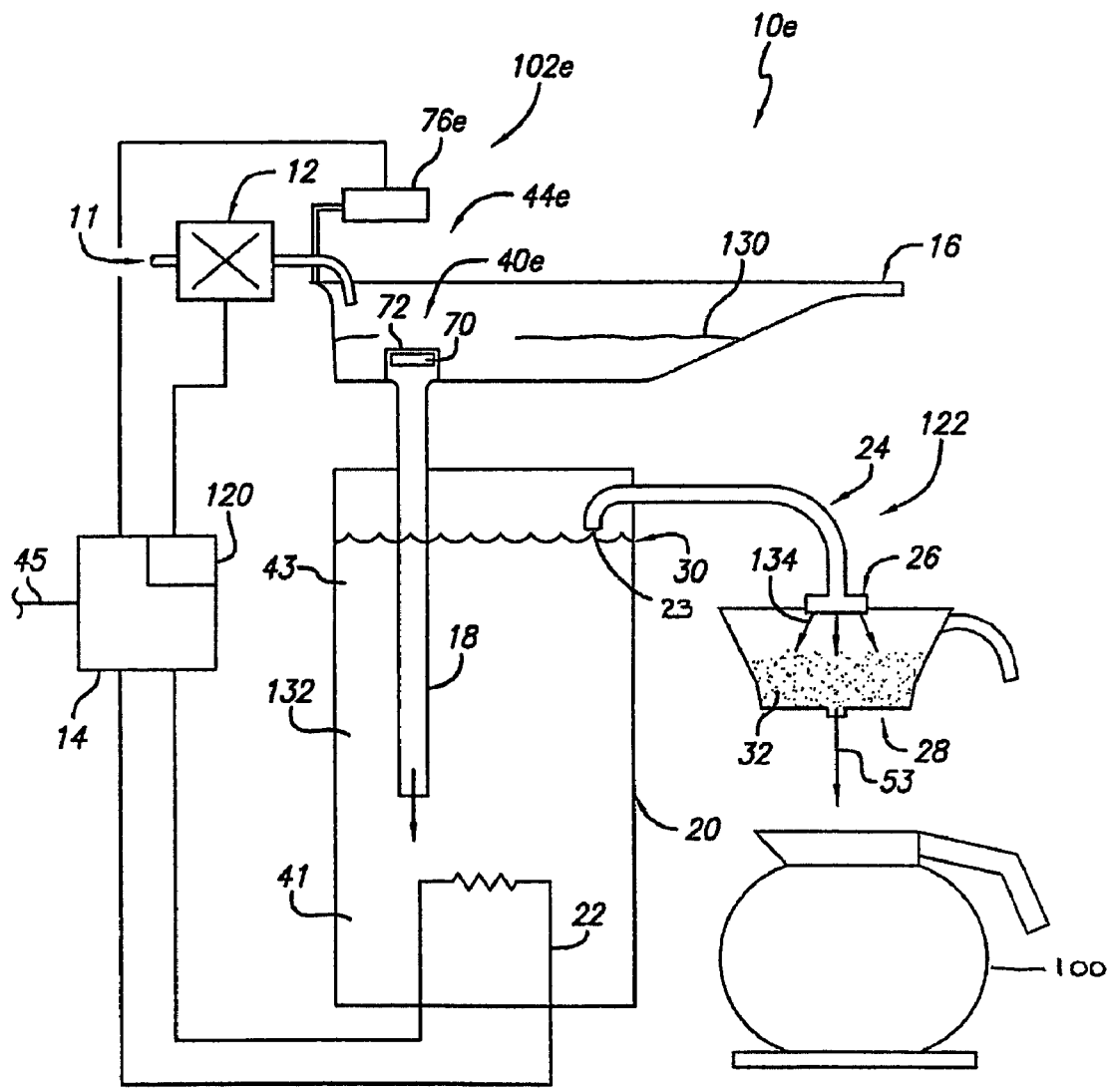
FIG. 7 is a diagrammatic cross-sectional view of another embodiment.

Referring now to FIG. 6, the controllable valve 44d is embodied in the form of an electromagnet 76 positioned along the connecting tube 18. A stopper 70 combines the stopper 48 as previously disclosed with the magnetic portion 60 as previously disclosed. When the electro-magnet 76 is energized by the controller 14, it repels the stopper 70 away from the magnet 76. This repelling force disengages the stopper 70 to allow water to flow from the basin 16 into the water reservoir 20. Movement of the stopper 70 is limited by a retaining structure 72. When the magnet 76 is de-energized, the stopper 70 is moved within the retaining structure 72 by gravity and by water flow downwardly and back into position to block the flow of water into the water reservoir 20. Once again, the controllable valve 44 can be operated by repeatedly energizing and de-energizing the magnet 76 to provide a pulsed or controlled opening and closing of the passage 17. This type of pulse brewing function can be used to provide desired brewing results with a pour-in basin type of beverage maker 10. It should be noted, as previously noted above, components such as the stopper 70 and structure 72 are formed of a suitable food grade material since they are positioned in the food contact area of the basin 16.

In FIG. 7, the controllable valve 40e includes a magnet configuration such that an electromagnet 76e is positioned external to the basin 16. The same or similar magnet and stopper combination 70 combined with the structure 72 is used internal to the basin 16. In FIG. 7, the stopper normally blocks the passage 17 while in the non-energized or resting position. When the electromagnet 76 is energized by the controller 14, it attracts the stopper 70 away from the passage 17. The attracting forces on the magnet and stopper combination 70 lifted out of the way of the passage upwardly toward the electromagnet 76e. The stopper 70 is limited in its movement toward the electromagnet 76e by a retaining structure 72. Similar to the retaining structure as shown in FIG. 6, the retaining structure 72 in FIG. 7 allows for the passage of water through or around the structure and into the passage 17. In this regard, the structure 72 can be formed in a cage-like or perforated configuration to allow the passage and draining of water in the basin from the basin and into the reservoir 20. The electromagnet 76e powered off the attractive forces asserted on the stopper magnet combination 70 are removed and the stopper 70 returns to its position covering the passage 17. Once again, by positioning a portion of the valve 40e away from the space between the basin 16 and reservoir 20 the space can be eliminated such that the basin 16 can be placed on top of the reservoir 20 thereby maintaining or reducing the overall height of the beverage maker 10.

The beverage making apparatus 10 is designed for dispensing liquid into a beverage making substance 32 to produce a beverage 53. The beverage making apparatus 10 includes a liquid basin 16 for receiving a liquid such as water. The liquid may be dispensed by the controllable valve 12 through the pressurized water line 11 or may be dispensed manually into the basin 16. The basin 16 communicates by way of the passage 17 with the reservoir 20. The reservoir 20 retains a volume of heated liquid which is heated by a heating device or element associated with the reservoir 20.

The beverage making apparatus also includes using the timer 120 to control the time at which the apparatus 10 is activated. For example, the timer 120 can be used to set a time for delaying the initiation of a brewing cycle. A brewing cycle includes the activation of the valve 40 (40a-e) with any intervening steps until the conclusion of the flow of water from the basin into the reservoir 20 and the resulting draining of the funnel 28. By way of further example, the controller 14 can be programmed to provide a desired beverage brewing cycle. The timer 120 can be set so that the cycle will initiate at some time in the future. In this regard, it is envisioned that the timer 120 in conjunction with the controller 14 can be used to set up the apparatus 10 in the evening and programmed to initiate the brewing cycle in the morning. This might be useful to parties such as coffee shops, individuals and offices which wish to have fresh-brewed coffee on hand at the start of a day. In other words, the timer can be used as an alarm clock or other delay device to start the brewing process once the water is placed in the basin and coffee 32 is placed in the funnel 28. This timer delay might also be used to allow an operator to set up the beverage making apparatus 10 at any other point during the day and automatically initiating the brewing process at the predetermined delayed time.

The controllable valve 40 (40a-e) is positioned proximate to the basin 16 and the reservoir 20 for controlling flow of water from the basin 16 to the reservoir 20. The controller 14 is coupled to the control valve 40 for opening and closing the valve 40 and selectively operating the control valve 40 by controlling the flow of liquid from the basin to the reservoir. A timer 120 is coupled to the controller and may be used to selectively operate the control valve 40 on a timed basis. The timer 120 can be set to delay the start of a brewing cycle. In each of the embodiments disclosed the timer 120 may be used in the programming of the controller 14 so that the controllable valve 40 (40a-e) may be actuated repeatedly or predetermined for other periods of time to open and close the valve. This allows for pulse brewing operations of the pour-in basin beverage maker 10. In this regard, the valve 40 (40a-e) provides one or more pulses of water from the volume of water retained in the basin 16 to the reservoir 20. This provides the pulse brewing feature which may provide controllable brewing characteristics on a pour-in basin type brewer.

It should be noted, that while a pour-in basin brewer is disclosed with regard to this timered pulse brewing feature, it is envisioned that a similar valve 40 (40a-e) system could be used with a brewer using a flash heater and no reservoir 20. It is fully within the scope of the claims and the spirit of this disclosure to include this pulse brew feature with this alternate type of beverage maker. In this regard, the valve 40 (40a-e) is positioned on a line connecting a basin 16 to a flash heating device. As the water is dispensed from the flash heating device through a tube 24 to a spray head 26 the flow from the basin can be controlled. Additionally, such a flash heating brewer may take the form of the brewer as disclosed herein except for the substitution of a flash heating device for the reservoir 20 as disclosed herein. While the basin in a flash heating device may take a different configuration, it still provides a container portion for retaining a quantity of water to be flowed from the basin to the funnel 28.

It should also be noted that the control valve 40 (40a-e) as disclosed herein can be positioned external to the basin 16 and reservoir 20, partially or wholly within the basin 16 and partially or wholly within the reservoir 20.

Also disclosed herein is the fill tube 18 which communicates with the basin 16 and the reservoir for providing a liquid flow path from the basin 16 to the reservoir. The control valve 40 (40a-e) communicates with the fill tube 18 to selectively control the flow of liquid through the fill tube 18. The fill tube can be sized and dimensioned to extend into the reservoir 20 for depositing the unheated liquid flowing from the basin 16 into close proximity with the heating element 22.

The funnel 28 is selectively retainable on the apparatus 10 through use of known structures commonly found in the beverage maker industry. The funnel is placed in position to receive water flowing from the reservoir 20 through the dispense tube 24 and through the spray head 26. The beverage brewing substance such as ground coffee 32 retained in the funnel 28 is saturated with water flowing from the spray head 26. The resultant beverage 53 dispensed from the funnel 28 flows into a container or carafe 100 positioned therebelow. The dispensing tube 24 is an embodiment as disclosed herein of a liquid delivery assembly 122 which includes the dispensing tube 24 and the spray head 26. The liquid delivery assembly 122 generally delivers liquid from the reservoir 20 to the funnel.

Several embodiments of the controllable valve are disclosed such as the embodiments using a stopper 48 connected to a lever 50. Generally, these embodiments include a stopper moving device 102 (102c-e). In the embodiments shown in FIGS. 4 and 5, the stopper moving device 102, 102c includes a lever 50 and means for moving the stopper 44, 44c which is coupled to the controller 14. The embodiment shown in FIG. 4 shows a mechanical linkage 47 between the lever 50 and the stopper moving means 44. A similar embodiment as shown in FIG. 5 eliminates the linkage and relies upon electromagnetic forces to move the stopper 48.

The embodiments shown in FIGS. 6 and 7 also use an electromagnetic configuration to open and close the passage 17 between the basin 16 and reservoir 20. In the embodiments shown in FIGS. 6 and 7 a stopper 117 includes the stopper and magnetic features in one structure. In FIG. 6, magnetic repulsive forces are used to displace the stopper 70 away from the passage. In FIG. 7, electromagnetic attractive forces are used to lift the stopper 70 away from the passage 17. In both configurations, the electromagnet 76, 76e is coupled to the controller 14 for providing a controllable electromagnetic effect on the stopper 70.

In use, the present disclosure also includes a method for controlling the beverage making apparatus 10 for dispensing liquid into a beverage making substance 32 to produce a beverage. In this regard, liquid 130 is dispensed into the basin 16. The water is retained in the basin when the controllable valve 40 (40a-e) is in the closed position. This prevents the water from flowing from the basin 16 through the passage 17 to the reservoir 20. The controller 14, connected to the controllable valve, selectively operates the valve to control the flow of water 130 from the basin 16 to the reservoir 20. When the controller operates the valve water will flow into the reservoir 20 thereby displacing water 132 in the reservoir. When the water level rises sufficiently water flows through the dispensing tube 24 and out through the spray head 26. Water 134 dispensed from the spray head is used to saturate and infuse a beverage brewing substance 32 such as coffee. The resultant beverage 53 is dispensed into the carafe 100. The controller 14 is programmed such that when a control signal is provided to the controller by operation of a controllable switch such as by way of operating a control panel 140 of known construction, the brewer 10 will be activated to initiate a brew cycle. During the brew cycle, the controller 14 will operate the valve to allow water to flow as discussed above.

The method of controlling the beverage making apparatus also includes controllably operating the control valve 40 (40a-e) to periodically, either regularly or irregularly, open and close the valve to controllably pass water from the basin through the control valve to the reservoir. Such water passing to the reservoir displaces liquid in the reservoir and dispenses it to the beverage making substances 32 to produce beverage 53. The method of controlling the beverage making apparatus also includes using the timer 120 to control the time at which the apparatus 10 is activated. For example, the timer 120 can be used to set a time for delaying the initiation of a brewing cycle. A brewing cycle includes the activation of the valve 40 (40a-e) with any intervening steps until the conclusion of the flow of water from the basin into the reservoir 20 and the resulting draining of the funnel 28. By way of further example, the controller 14 can be programmed to provide a desired beverage brewing cycle. The timer 120 can be set so that the cycle will initiate at some time in the future. In this regard, it is envisioned that the timer 120 in conjunction with the controller 14 can be used to set up the apparatus 10 in the evening and programmed to initiate the brewing cycle in the morning. This might be useful to parties such as coffee shops, individuals and offices which wish to have fresh-brewed coffee on hand at the start of a day. In other words, the timer can be used as an alarm clock or other delay device to start the brewing process once the water is placed in the basin and coffee 32 is placed in the funnel 28. This timer delay might also be used to allow an operator to set up the beverage making apparatus 10 at any other point during the day and automatically initiating the brewing process at the predetermined delayed time.

The present disclose also includes the method of cleaning the brewing apparatus 10. By removing the valve 40 (40*a-e*) from the dispensing line 24, the entire length and internal area of the dispensing line can be cleaned. In this regard, a cleaning device such as a wire brush, spring, rod or any other device used to remove scale and mineral deposits from the dispense line 24 can be inserted. The cleaning device can be inserted all the way from the spray head 26 (typically, the spray head 26 must be removed from the dispensing line 24) to the inlet 23 positioned inside of the reservoir 20. The cleaning device can be inserted all the way through thereby assuring that significant or complete cleaning of the internal surface of the tube 24 can be accomplished all the way from the outlet of the spray head to the inlet 23 in the reservoir 20.

While a preferred embodiment of the disclosure is shown and described, it is envisioned that those skilled in the art may devise various modifications and equivalents without departing from the spirit and scope of the disclosure as recited in the following claims.

What is claimed is:

1. A beverage making apparatus for dispensing liquid into a beverage making substance to produce a beverage, the beverage making apparatus comprising:
   a liquid basin for receiving a liquid;
   a reservoir for heating and retaining a volume of liquid;
   a fill tube communicating with the basin and extending into the reservoir for providing a liquid flow path directly from the basin to the reservoir;
   a control valve controllably communicating directly with the fill tube for directly controlling flow of liquid from the basin to the reservoir;
   an electrical controller coupled to the control valve for at least selectively operating the control valve for selectively controlling the flow of liquid from the basin to the reservoir;
   a fill passage formed in the basin and the reservoir communicating with the basin and the reservoir for passing water from the basin to the reservoir;
   the controllable valve including a stopper selectively positionable relative to the fill passage for selectively impeding and permitting the flow of water from the basin to the reservoir;
   a stopper moving device including a lever with the stopper attached;
   the lever being coupled with the controller for selectively moving the stopper relative to the passage;
   a pivot provided in association with the lever, the pivot being spaced along the lever away from the stopper for providing a pivoting of the lever for moving the stopper relative to passage; and
   means for moving the stopper coupled to the controller and attached to the lever for controllably moving the lever to move the stopper.

2. The beverage making apparatus of claim 1, further comprising: a timer coupled to the controller for selectively operating the control valve on a timed basis.

3. The beverage making apparatus of claim 1, wherein the controllable valve includes a solenoid coupled to the lever for controllably moving the stopper.

4. The beverage making apparatus of claim 1, wherein the control valve is positioned at least partially in the basin.

5. The beverage making apparatus of claim 1, wherein the control valve is positioned in the basin.

6. The beverage making apparatus of claim 1, wherein the control valve is at least partially positioned between the basin and reservoir.

7. The beverage making apparatus of claim 1, wherein the control valve is positioned at least partially in the reservoir.

8. The beverage making apparatus of claim 1, wherein the control valve is positioned in the reservoir.

9. The beverage making apparatus of claim 1, further comprising: a heating device associated with the reservoir for at least heating liquid in the reservoir and wherein the fill tube extends into the reservoir for depositing liquid from the basin proximate to the heating device.

10. The beverage making apparatus of claim 1, a funnel selectively retainable on the apparatus and in communication with the liquid delivery assembly, the funnel retaining a quantity of beverage making substance for combination with liquid to produce a beverage; and a liquid delivery assembly for delivering liquid from the reservoir to a beverage making substance retained in the funnel.

11. The beverage making apparatus of claim 1, further comprising:
    the beverage making apparatus being a drip brew, non-pressurized apparatus;
    liquid placed in the basin flowing through the fill tube to the reservoir generally under the influence of gravity; and
    a heating device associated with the reservoir for at least heating liquid in the reservoir, the fill tube extends into the reservoir for depositing liquid from the basin proximate to the heating device.

12. A beverage making apparatus for dispensing liquid into a beverage making substance to produce a beverage, the beverage making apparatus comprising:
    a liquid basin for receiving a liquid;
    a reservoir for heating and retaining a volume of liquid;
    a fill tube communicating with the basin and extending into the reservoir for providing a liquid flow path directly from the basin to the reservoir;
    a control valve controllably communicating directly with the fill tube for directly controlling flow of liquid from the basin to the reservoir;
    an electrical controller coupled to the control valve for at least selectively operating the control valve for selectively controlling the flow of liquid from the basin to the reservoir;
    a fill passage formed in the basin and the reservoir communicating with the basin and the reservoir for passing water from the basin to the reservoir;
    the controllable valve including a stopper selectively positionable relative to the fill passage for selectively impeding and permitting the flow of water from the basin to the reservoir;
    a stopper moving device including a magnetic structure carried on the stopper;

means for movably retaining the stopper proximate to the passage; and means for moving the stopper coupled to the controller to controllably move the stopper relative to the passage.

13. The beverage making apparatus of claim 12, wherein the moving means comprises a controllable magnetic device for attracting and repelling the magnetic structure carried on the stopper to move the stopper relative to the passage.

14. The beverage making apparatus of claim 12, further comprising a timer coupled to the controller for selectively operating the control valve on a timed basis.

15. The beverage making apparatus of claim 12, wherein the control valve is positioned at least partially in the basin.

16. The beverage making apparatus of claim 12, wherein the control valve is positioned in the basin.

17. The beverage making apparatus of claim 12, wherein the control valve is at least partially positioned between the basin and reservoir.

18. The beverage making apparatus of claim 12, wherein the control valve is positioned at least partially in the reservoir.

19. The beverage making apparatus of claim 12, wherein the control valve is positioned in the reservoir.

20. The beverage making apparatus of claim 12, further comprising:

the beverage making apparatus being a drip brew, non-pressurized apparatus;

liquid placed in the basin flowing through the fill tube to the reservoir generally under the influence of gravity; and a heating device associated with the reservoir for at least heating liquid in the reservoir, the fill tube extends into the reservoir for depositing liquid from the basin proximate to the heating device.

21. The beverage making apparatus of claim 12, further comprising: a heating device associated with the reservoir for at least heating liquid in the reservoir and wherein the fill tube extends into the reservoir for depositing liquid from the basin proximate to the heating device.

22. The beverage making apparatus of claim 12, a funnel selectively retainable on the apparatus and in communication with the liquid delivery assembly, the funnel retaining a quantity of beverage making substance for combination with liquid to produce a beverage; and a liquid delivery assembly for delivering liquid from the reservoir to a beverage making substance retained in the funnel.

* * * * *